US012773982B2

(12) United States Patent
Prinzhausen et al.

(10) Patent No.: US 12,773,982 B2
(45) Date of Patent: Oct. 27, 2026

(54) METHOD FOR ASCERTAINING A REPLACEMENT TRAJECTORY, COMPUTER PROGRAM PRODUCT, PARKING ASSISTANCE SYSTEM AND VEHICLE

(71) Applicant: Valeo Schalter und Sensoren GmbH, Bietigheim-Bissingen (DE)

(72) Inventors: Stefanie Prinzhausen, Bietigheim-Bissingen (DE); Cedric Langer, Bietigheim-Bissingen (DE); Wael Guechai, Bietigheim-Bissingen (DE); Fabian Fuchs, Bietigheim-Bissingen (DE); Wolfgang Gaim, Bietigheim-Bissingen (DE); Sharad Shivajirao Bhadgaonkar, Bietigheim-Bissingen (DE); Stefan Ewald, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 208 days.

(21) Appl. No.: 18/014,564

(22) PCT Filed: Jun. 29, 2021

(86) PCT No.: PCT/EP2021/067802
§ 371 (c)(1),
(2) Date: Jan. 5, 2023

(87) PCT Pub. No.: WO2022/008293
PCT Pub. Date: Jan. 13, 2022

(65) Prior Publication Data

US 2023/0249675 A1 Aug. 10, 2023

(30) Foreign Application Priority Data

Jul. 6, 2020 (DE) ..................... 10 2020 117 773.9

(51) Int. Cl.
*B60W 30/06* (2006.01)
*B60W 40/02* (2006.01)
*B60W 60/00* (2020.01)

(52) U.S. Cl.
CPC ............ *B60W 30/06* (2013.01); *B60W 40/02* (2013.01); *B60W 60/0011* (2020.02);
(Continued)

(58) Field of Classification Search
CPC ...... B60W 30/06; B60W 30/12; B60W 30/16; B60W 30/162; B60W 30/165;
(Continued)

(56) References Cited

U.S. PATENT DOCUMENTS 9,827,970 B2 * 11/2017 Lavoie .................. B60W 10/20
11,292,455 B2 * 4/2022 Inaba .................. B60W 30/143
(Continued)

FOREIGN PATENT DOCUMENTS

CN 105764773 A 7/2016
CN 109937169 A 6/2019
(Continued)

OTHER PUBLICATIONS

Enright, DE 10 2017 115 988, machine translation (Year: 2019).*
(Continued)

*Primary Examiner* — Mark L. Greene
(74) *Attorney, Agent, or Firm* — Osha Bergman Watanabe & Burton LLP

(57) ABSTRACT

A method for determining a replacement trajectory for a vehicle operated in an autonomous driving mode is disclosed. The method involves receiving a predefined trajectory with a first section and a second section that are linked to one another at a travel direction turning point, wherein a travel direction of the first section is different from that of the second section, receiving a sensor signal indicative of
(Continued)

surroundings of the vehicle, detecting an obstacle in the surroundings on the basis of the received sensor signal, calculating at least one collision point on the predefined trajectory at which a collision occurs between the vehicle and the obstacle, and ascertaining the replacement trajectory based on the at least one calculated collision point. The replacement trajectory connects a starting point, located before the collision point, to an end point on the predefined trajectory, located after the collision point, while avoiding the collision.

6 Claims, 7 Drawing Sheets

(52) U.S. Cl.
CPC ..... *B60W 2554/20* (2020.02); *B60W 2554/40* (2020.02); *B60W 2554/80* (2020.02)

(58) Field of Classification Search
CPC .. B60W 30/17; B60W 40/02; B60W 60/0011; B60W 2554/00; B60W 2554/20; B60W 2554/40–408; B60W 2554/80; B60K 28/00–165; B60K 2028/003; B60K 2028/006; B62D 15/0285; G05D 1/0061; G05D 1/0088; G05D 1/009; G05D 1/021; G05D 1/0214; G05D 1/0221; G05D 1/0223
See application file for complete search history.

(56) References Cited

U.S. PATENT DOCUMENTS

| | | | | |
|---|---|---|---|---|
| 11,345,337 | B2 * | 5/2022 | Hasejima | G06V 20/58 |
| 2010/0114434 | A1 | 5/2010 | Kawabata et al. | |
| 2016/0264137 | A1 | 9/2016 | Lavoie | |
| 2020/0001862 | A1 | 1/2020 | Luo et al. | |

FOREIGN PATENT DOCUMENTS

| | | | | |
|---|---|---|---|---|
| DE | 102012014450 | A1 | 1/2014 | |
| DE | 102013015348 | A1 | 4/2014 | |
| DE | 102014202243 | A1 | 8/2015 | |
| DE | 102016013711 | A1 | 5/2017 | |
| DE | 102017115988 | A1 | 1/2019 | |
| DE | 102018114497 | A1 | 12/2019 | |
| EP | 2202132 | A2 | 6/2010 | |
| EP | 3605385 | A1 * | 2/2020 | G06V 10/82 |
| EP | 3608188 | A1 | 2/2020 | |
| JP | 2008221894 | A | 9/2008 | |

OTHER PUBLICATIONS

Prinzhausen, DE 10 2018 114 497, machine translation. (Year: 2019).*
International Search Report and Written Opinion in corresponding International Application No. PCT/EP2021/067802, mailed Sep. 15, 2021 (12 pages).
German Search Report issued in corresponding German Application No. 10 2020 117 773.9, dated Mar. 18, 2021 (5 pages).
Notification of Reason for Rejection issued in corresponding Japanese Patent Application No. 2023-500436, mailed on May 24, 2024 (11 pages).
Office Action issued in counterpart Korean Patent Application No. 10-2023-7000707 mailed Oct. 23, 2024 (10 pages).
Office Action in the counterpart Chinese application No. 202180048045.4, issued on Feb. 28, 2026 (17 pages with translation).

* cited by examiner

METHOD FOR ASCERTAINING A REPLACEMENT TRAJECTORY, COMPUTER PROGRAM PRODUCT, PARKING ASSISTANCE SYSTEM AND VEHICLE

The present invention relates to a method for ascertaining a replacement trajectory, a computer program product, a parking assistance system and a vehicle having a parking assistance system.

Parking assistance systems are known that can autonomously retrace a trained trajectory with a vehicle. In these, the trajectory is first trained, that is, a user of the vehicle drives the trajectory to be trained manually, wherein the parking assistance system or another system records the trajectory. At a later time, the user can then have the trained trajectory retraced by the parking assistance system.

This can be problematic if environmental conditions have changed in the meantime, in particular if obstacles are found in the area of the trained trajectory. This often leads to a termination of the retracing maneuver.

Document DE 10 2017 115 988 A1 describes a method for the automated operation of a vehicle, in which a trajectory is provided and an object is detected in a region corresponding to the trajectory. The object detected in the region is classified and the motion path of the trajectory is modified depending on the classification of the detected object.

Against this background, one object of the present invention is to improve the operation of a vehicle.

According to a first aspect, a method for ascertaining a replacement trajectory for a vehicle is proposed, which is operable by means of a parking assistance system in an autonomous driving mode. In a first step, a predefined trajectory is received that comprises at least a first section and a second section that are linked to one another at a travel direction turning point, wherein a travel direction of the first section is different from a travel direction of the second section. In a second step, a sensor signal indicative of the surroundings of the vehicle is received. In a third step, an obstacle in the environment is detected based on the received sensor signal. In a fourth step, at least one collision point is calculated which is a point on the predefined trajectory, at which a collision occurs between the vehicle and the obstacle. The calculation is based on the predefined trajectory, the detected obstacle and a vehicle geometry of the vehicle. In a fifth step, the replacement trajectory is ascertained based on at least one calculated collision point. The replacement trajectory connects a starting point on the predefined trajectory located before the collision point to an end point on the predefined trajectory located after the collision point, avoiding the collision.

This method has the advantage that an obstacle which prevents safe continuation along the predefined trajectory, in particular when this is in the region of the travel direction turning point, can be bypassed according to the ascertained replacement trajectory. This means that a corresponding retracing maneuver can be carried out successfully and does not have to be aborted. The proposed method is carried out in particular by the parking assistance system of the vehicle.

The parking assistance system, which can also be referred to as a driver assistance system, is configured in particular for partially autonomous or fully autonomous driving of the vehicle. Partially autonomous driving is understood as meaning, for example, that the parking assistance system controls a steering apparatus and/or an automatic speed level system. Fully autonomous driving is understood as meaning, for example, that the parking assistance system also additionally controls a drive device and a braking device. The parking assistance system may be implemented in the form of hardware and/or in the form of software. In the case of an implementation in the form of hardware, the parking assistance system may be, for example, in the form of a computer or a microprocessor. In the case of an implementation in the form of software, the parking assistance system may be in the form of a computer program product, a function, a routine, part of a program code or an executable object. In particular, the parking assistance system may be in the form of part of a superordinate control computer of the vehicle, for example an ECU (Engine Control Unit).

The vehicle is, for example, an automobile or even a truck. Preferably, the vehicle comprises a number of sensor units which are configured to capture the driving state of the vehicle and to capture an environment of the vehicle. Examples of such sensor units of the vehicle are image acquisition devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to the parking assistance system which carries out the partially autonomous or fully autonomous driving on the basis of the captured sensor signals.

The predefined trajectory is preferably a trained trajectory. For example, the parking assistance system or another system of the vehicle is configured to record and store a manually driven trajectory in a training mode. This involves, for example, recording various sensor signals, which characterize a driving condition of the vehicle, such as a speed, a position, a steering angle and the like, as uniquely as possible. In addition, sensor signals are recorded by environment sensors of the vehicle, which enable, for example, an image of the environment of the vehicle, in particular a position of obstacles in the environment. By playing back the driving state of the vehicle time-synchronously, i.e. by repeating it, the trained trajectory can be retraced.

For example, it is provided that a user starts a retracing maneuver by means of an input device, wherein the user selects the trajectory to be traced from a number of predefined trajectories or the parking assistance system proposes a suitable trajectory to the user based on a current position and orientation of the vehicle.

In this case, the predefined trajectory comprises at least one travel direction turning point, at which the travel direction of the vehicle changes. Accordingly, the travel direction in a first section before the travel direction turning point is opposite to a travel direction in a second section after the travel direction turning point. The travel direction can be determined, for example, by means of a direction of rotation of a wheel of the vehicle, wherein the direction of rotation of the wheel differs on the two sections, i.e. is first counterclockwise and then clockwise.

To retrace the predefined trajectory, it is desirable to take current environment sensor data into account. Therefore, the parking assistance system receives a sensor signal that is indicative of the surroundings. The parking assistance system can, for example, receive this directly from one or more environment sensors of the vehicle and combine multiple sensor signals of different environment sensors, or else the parking assistance system receives the sensor signal already in a preprocessed state, for example in the form of a digital environment map, in which detected obstacles in the environment are indicated.

Then, an obstacle in the environment is detected based on the received sensor signal. The detection of the obstacle comprises, for example, detecting coordinates of the obstacle or an outline of the obstacle in a coordinate system of the vehicle, detecting a geometry of the obstacle, detecting a type of the obstacle and the like. Put another way, the obstacle is classified. It is also possible to ascertain whether it is a static obstacle or a moving obstacle. A static obstacle does not change its position during the retracing maneuver or only within the range of a measurement inaccuracy, and a mobile obstacle moves or could move.

Then at least one collision point is calculated, which is a point on the predefined trajectory, at which a collision occurs between the vehicle and the obstacle. The calculation point is calculated based on the predefined trajectory, the detected obstacle and a vehicle geometry of the vehicle. The vehicle geometry of the vehicle is predefined in particular and comprises, for example, a geometric model with a plurality of edges and surfaces. For example, a collision point is a point at which, if the vehicle were to travel along the specified trajectory, the vehicle would touch the obstacle. This retracing can be simulated by the parking assistance system, for example. Each point on the predefined trajectory, at which the vehicle is in contact with or overlapping the obstacle, is calculated as a collision point, for example. A collision point can also exist if a predefined minimum distance, for example a safety distance, to the obstacle is undershot.

After the at least one collision point has been calculated, the replacement trajectory is ascertained based on the at least one calculated collision point. The replacement trajectory connects a starting point on the predefined trajectory, which is located before the collision point, to an end point on the predefined trajectory, which is located after the collision point, avoiding the collision. The replacement trajectory thus replaces a section in the predefined trajectory such that the target position of the predefined trajectory is attainable without a collision or a termination of the retracing maneuver occurring due to the obstacle. Preferably, the length of the replacement trajectory is minimized, so the replacement trajectory is as short as possible. This keeps a deviation from the predefined trajectory to a minimum.

According to one embodiment, the parking assistance system causes the vehicle to drive along the ascertained replacement trajectory. In particular, it is understood that the parking assistance system as described above operates the vehicle in a semi-autonomous or fully autonomous driving mode by generating and outputting the corresponding control commands and the like.

According to a further embodiment, the starting point of the replacement trajectory is located on the first section and the end point of the replacement trajectory is located on the second section.

In this embodiment, the replacement trajectory replaces a section of the predefined trajectory comprising the travel direction turning point. This is the case in particular if the obstacle is arranged in a region of the travel direction turning point, so that for example the travel direction turning point can no longer be reached without collisions.

According to a further embodiment, a distance of the obstacle from the travel direction turning point is less than a predefined limit value.

The predefined limit value depends, for example, on the dimensions of the vehicle and a maximum attainable steering angle. For example, for a small car, the limit value may be 3 m, 4 m, or 5 m. For a truck, the limit may be 7 m, 8 m or 9 m, for example.

In embodiments, the limit value for the distance of the obstacle from the travel direction turning point depends on a relative position of the obstacle to the first section and the second section. For example, the obstacle can lie on the specified trajectory, in which case the limit is set relatively large. In another example, the obstacle may not be located on the predefined trajectory behind the travel direction turning point. The limit value can then be set relatively small.

According to a further embodiment, the replacement trajectory comprises at least one further travel direction turning point.

It can also be said that the replacement trajectory replaces a travel direction change section of the predefined trajectory.

According to a further embodiment the replacement trajectory has a section which lies in an overlapping section on the predefined trajectory and the travel direction of which is opposite to the travel direction of the predefined trajectory in the overlapping section.

It may be the case that the obstacle is detected during the retracing of the predefined trajectory at a time when it is not possible to divert from the given trajectory to the left or right, for example because the obstacle was detected too late. Then, for example, the replacement trajectory can initially comprise backtracking on the predetermined trajectory to bring the vehicle to an improved starting position from which the obstacle can be bypassed without collisions.

According to a further embodiment, a maximum offset of the replacement trajectory with respect to the predefined trajectory is less than a predefined maximum offset.

For example, the offset is defined as the shortest distance of a point on the replacement trajectory to the predefined trajectory. The offset can also be determined taking into account the vehicle geometry.

According to a further embodiment, the replacement trajectory has at least three travel direction turning points.

For example, in particularly complicated cases, in which a deviation from the predetermined trajectory is barely possible, a maneuvering of the vehicle can be helpful to avoid the obstacle by means of the replacement trajectory.

According to a further embodiment, a distance of the starting point of the replacement trajectory to the collision point is less than a predefined maximum distance.

This ensures that the deviation from the specified trajectory is not made too early. The predefined maximum distance can depend in particular on the vehicle geometry and a maximum steering angle. For example, the predefined maximum distance is 3 m, 4 m, 5 m, 6 m, 7 m, 8 m, 9 m, or even 10 m.

According to a further embodiment of the method, the length of the replacement trajectory is less than a predefined maximum length.

According to a second aspect, what is proposed is a computer program product that comprises commands that, when the program is executed by a computer, prompt said computer to perform the method according to the first aspect.

A computer program product, such as a computer program means, can be provided or supplied as a storage medium, such as a memory card, USB stick, CD-ROM, DVD, or else in the form of a downloadable file from a server to a network. This may take place, for example, in a wireless communication network by transmitting a corresponding file containing the computer program product or the computer program means.

According to a third aspect, a parking assistance system for a vehicle is proposed. The parking assistance system, which can also be referred to as a driver assistance system, is configured for automatically driving the vehicle along a trajectory. The parking assistance system comprises a receiving unit for receiving a predefined trajectory and for receiving a sensor signal indicative of surroundings of the vehicle. The predefined trajectory comprises at least a first section and a second section that are linked to one another at a travel direction turning point, wherein a travel direction of the first section is different from a travel direction of the second section. The parking assistance system further comprises a detection unit for detecting an obstacle in the surroundings depending on the received sensor signal, and a calculation unit for calculating at least one collision point, which is a point on the predefined trajectory at which a collision occurs between the vehicle and the obstacle, depending on the predefined trajectory, the detected obstacle and a vehicle geometry of the vehicle. In addition, the parking assistance system has an ascertaining unit for ascertaining a replacement trajectory based on the at least one calculated collision point, wherein the replacement trajectory connects a starting point on the predefined trajectory, which is located before the collision point, to an end point on the predefined trajectory, which is located after the collision point, while avoiding the collision.

The parking assistance system is preferably operated with the method of the first aspect. The parking assistance system has the same advantages that have been described for the method of the first aspect. The embodiments and features described for the proposed method apply accordingly to the proposed parking assistance system.

The parking assistance system is designed in particular for partially autonomous or fully autonomous driving of the vehicle. Partially autonomous driving is understood as meaning, for example, that the parking assistance system controls a steering apparatus and/or an automatic speed level system. Fully autonomous driving is understood as meaning, for example, that the parking assistance system also additionally controls a drive device and a braking device. The parking assistance system and/or any unit of the parking assistance system, for example the reception unit, the detection unit, the calculation unit and/or the ascertainment unit, may be implemented in the form of hardware and/or in the form of software. In the case of an implementation in the form of hardware, the parking assistance system or the respective unit may be designed for example as a computer or as a microprocessor. In the case of an implementation in the form of software, the parking assistance system or the respective unit may be designed as a computer program product, as a function, as a routine, as part of a program code or as an executable object. In particular, the parking assistance system or the respective unit may be in the form of part of a superordinate control computer or control system of the vehicle, for example an ECU (Engine Control Unit).

According to one embodiment of the parking assistance system, this is configured for automatic driving of the vehicle along the replacement trajectory.

A further aspect proposes a vehicle with a parking assistance system according to the third aspect.

The vehicle is, for example, an automobile or even a truck. Preferably, the vehicle comprises a number of sensor units which are configured to capture the driving state of the vehicle and to capture an environment of the vehicle. Examples of such sensor units of the vehicle are image acquisition devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to the parking assistance system which carries out the partially autonomous or fully autonomous driving on the basis of the captured sensor signals.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Figure 1:
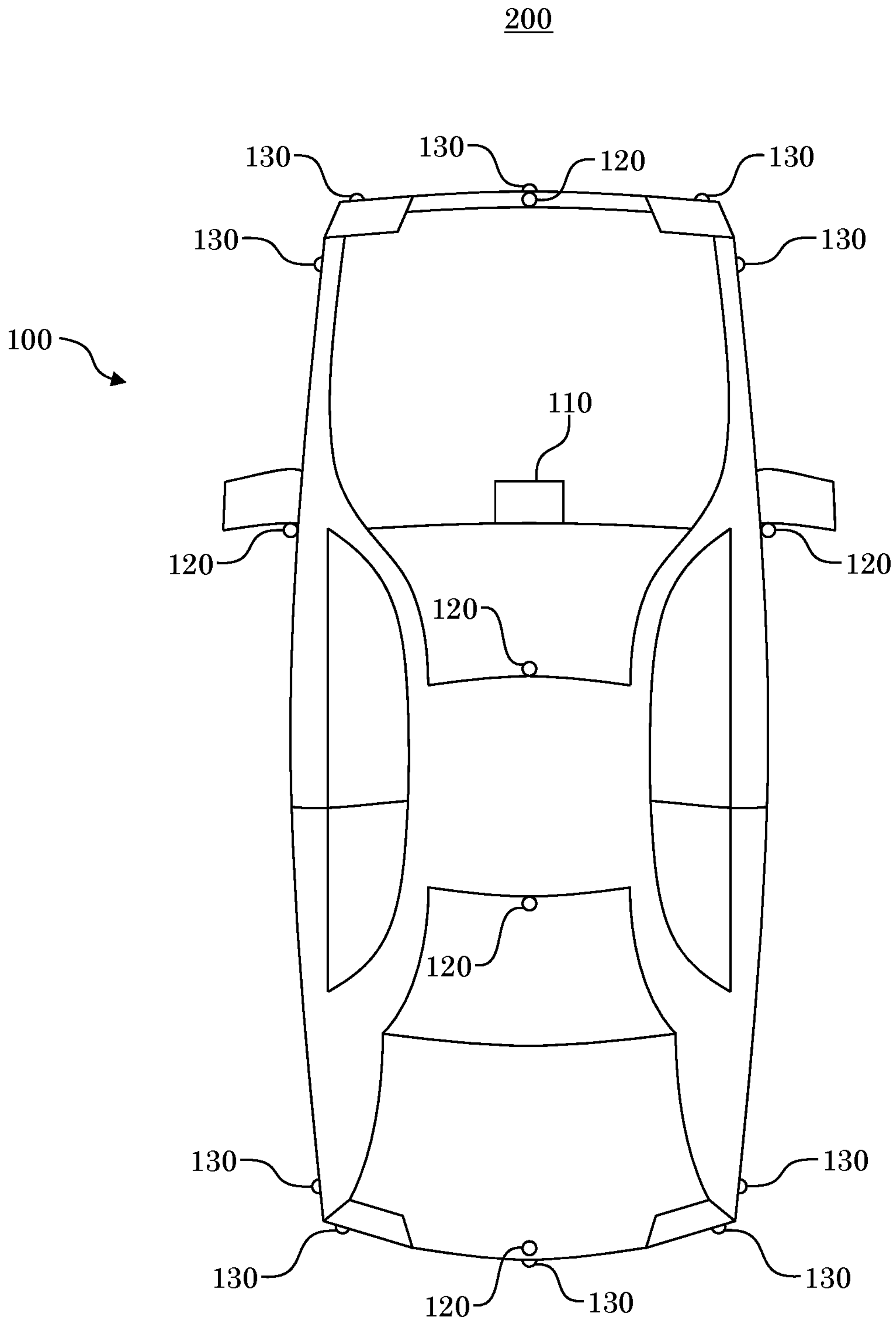
FIG. 1 shows a schematic view of a vehicle from a bird's eye view.

FIG. 1 shows a schematic view of a vehicle 100 from a bird's eye view. The vehicle 100 is, for example, an automobile that is arranged in an environment 200. The automobile 100 has a parking assistance system 110 which is in the form of a control device, for example. In addition, a plurality of environment sensor devices 120, 130 are arranged on the automobile 100, which can be, for example, optical sensors 120 and ultrasonic sensors 130. The optical sensors 120 comprise for example visual cameras, a radar and/or a lidar. The optical sensors 120 may each capture an image of a respective region from the environment 200 of the automobile 100 and output it as an optical sensor signal. The ultrasonic sensors 130 are configured to detect a distance from objects arranged in the environment 200 and to output a corresponding sensor signal. Using the sensor signals captured by the sensors 120, 130, the parking assistance system 110 is able to drive the automobile 100 partially autonomously or even fully autonomously. In addition to the optical sensors 120 and ultrasonic sensors 130 illustrated in FIG. 1, provision may be made for the vehicle 100 to have various other sensor devices 120, 130. Examples of these are a microphone, an acceleration sensor, an antenna having a coupled receiver for receiving electromagnetically transmissible data signals, and the like.

The parking assistance system 110 is designed to ascertain a replacement trajectory ET (see FIGS. 2-6), as described in detail below on the basis of FIGS. 2-6 for different scenarios.

Figure 2:
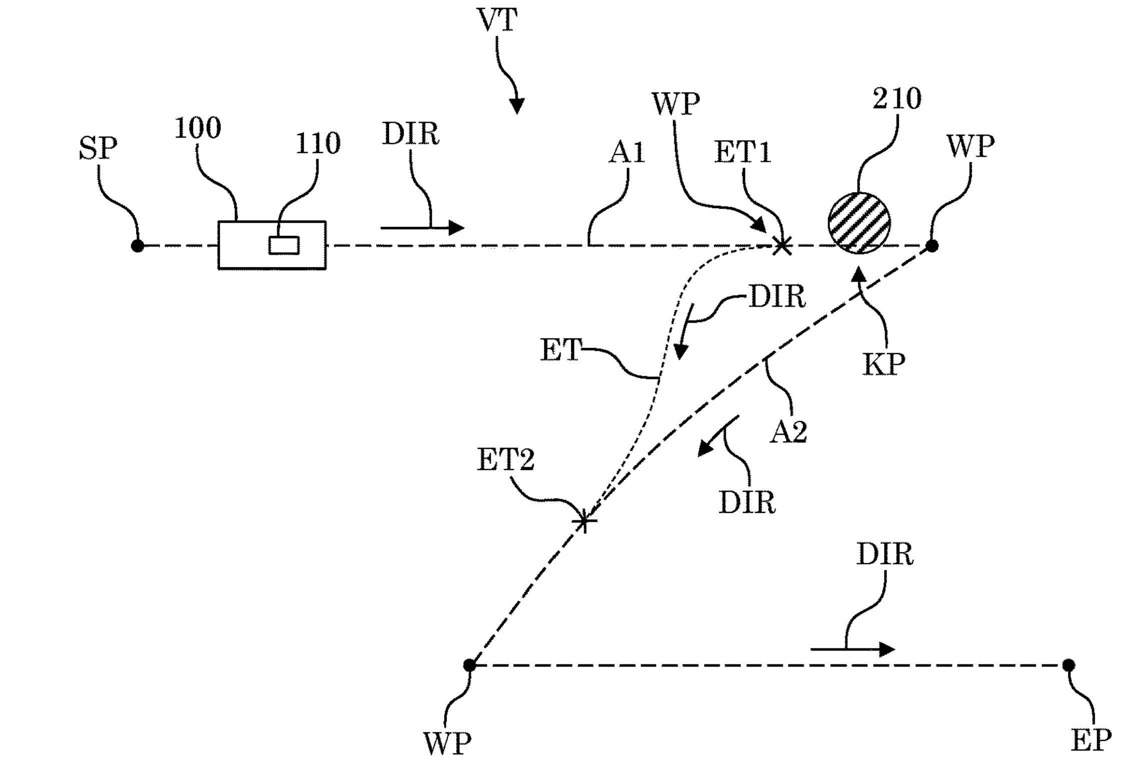
FIG. 2 shows a schematic view of a first example of a predefined trajectory and a replacement trajectory.

FIG. 2 shows a schematic view of a first example of a predefined trajectory VT and a replacement trajectory ET. The replacement trajectory ET replaces a section of the predefined trajectory VT, thus preventing a collision with an obstacle 210 which is located partly on the predefined trajectory VT.

The predefined trajectory VT is, for example, a trained trajectory and leads from a start position SP to an end position EP. In this example, the predefined trajectory VT comprises two travel direction turning points WP, at each of which the travel direction DIR of the vehicle 100 changes, as is evident from the arrows DIR.

In this first scenario, during a retracing procedure an obstacle 210 is arranged on the predefined trajectory VT in a first section A1 before the first travel direction turning point WP of the predefined trajectory VT. A collision point KP is calculated, at which the vehicle 100 collides with the obstacle 210 if it continues to drive on the predefined trajectory VT.

Therefore, a replacement trajectory ET is ascertained. This starts at a starting point ET1 on the predefined trajectory VT just before the obstacle 210. The starting point ET1 is also a travel direction turning point WP, that is, the travel direction DIR of the vehicle 100 is reversed at this point. The replacement trajectory ET follows a rolling path in a single section to an end point ET2 on the predefined trajectory VT, which lies on a second section A2 of the predefined trajectory VT. The travel direction DIR of the vehicle 100 at the end point ET2 corresponds to the travel direction DIR of the second section A2 of the predefined trajectory VT.

The remaining part of the predefined trajectory VT is free of obstacles 210 and can therefore be retraced as intended.

Figure 3:
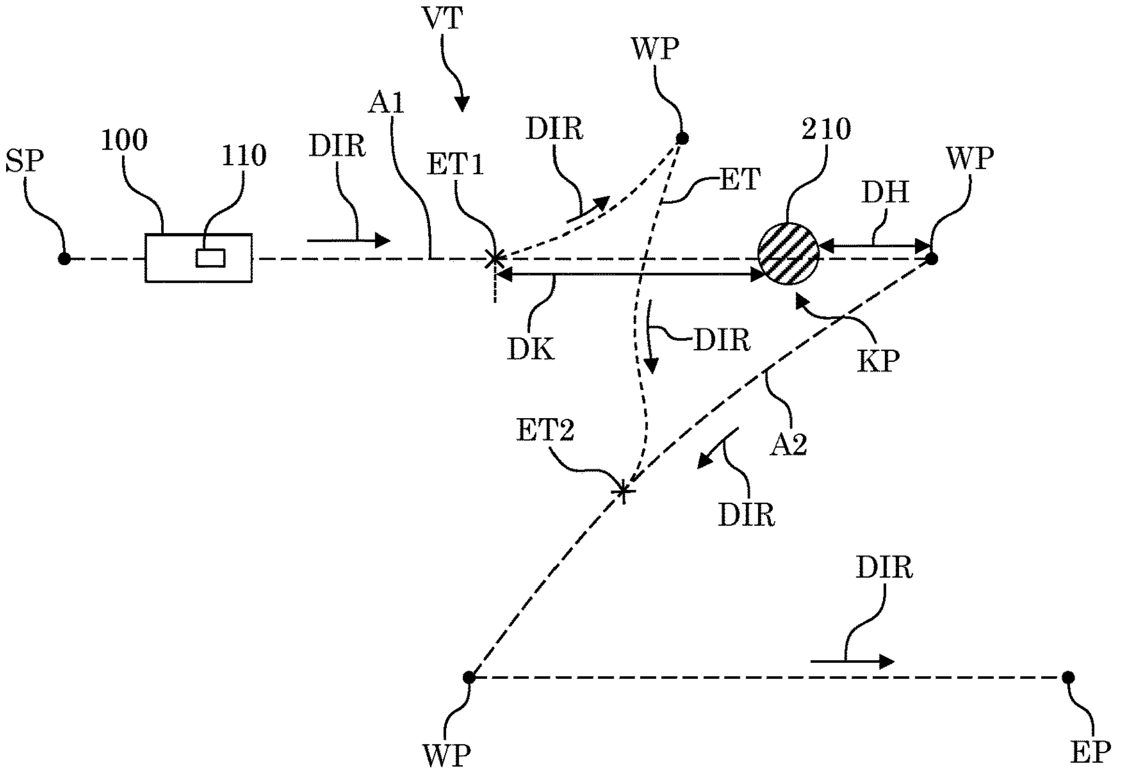
FIG. 3 shows a schematic view of a second example of a predefined trajectory and a replacement trajectory.

FIG. 3 shows a schematic view of a second example of a predefined trajectory VT and a replacement trajectory ET. The scenario is similar to that of FIG. 2, one difference being only that the obstacle 210 is detected early when the vehicle 100 is still further away from the obstacle 210. This allows a different planning of the replacement trajectory ET. In this example, the starting point ET1 of the replacement trajectory ET has a distance DK from the calculated collision point KP. In this case, the replacement trajectory ET initially deviates laterally from the predefined trajectory VT starting from the starting point ET1, wherein the travel direction DIR is initially the same. Then a travel direction turning point WP is reached, at which the travel direction DIR reverses. The predefined trajectory VT is crossed before the obstacle 210 and at the end point ET2 the replacement trajectory ET is finished and the vehicle 100 can continue along the predefined trajectory VT. The earlier the collision point KP is detected, i.e. the greater the distance DK between the vehicle 100 and the collision point KP, the more flexibility there is in planning the replacement trajectory ET.

FIG. 3 also shows a distance DH of the obstacle 210 from the first travel direction turning point WP of the predefined trajectory VT. This distance DH can be used as a parameter to ascertain the replacement trajectory ET. In particular, an upper limit for the distance DH may be provided. If the distance DH exceeds the upper limit, another evasive maneuver can be planned, for example, so that the vehicle 100 returns to the predefined trajectory VT before the first travel direction turning point WP, i.e., it drives around the obstacle 210, for example.

Figure 4:
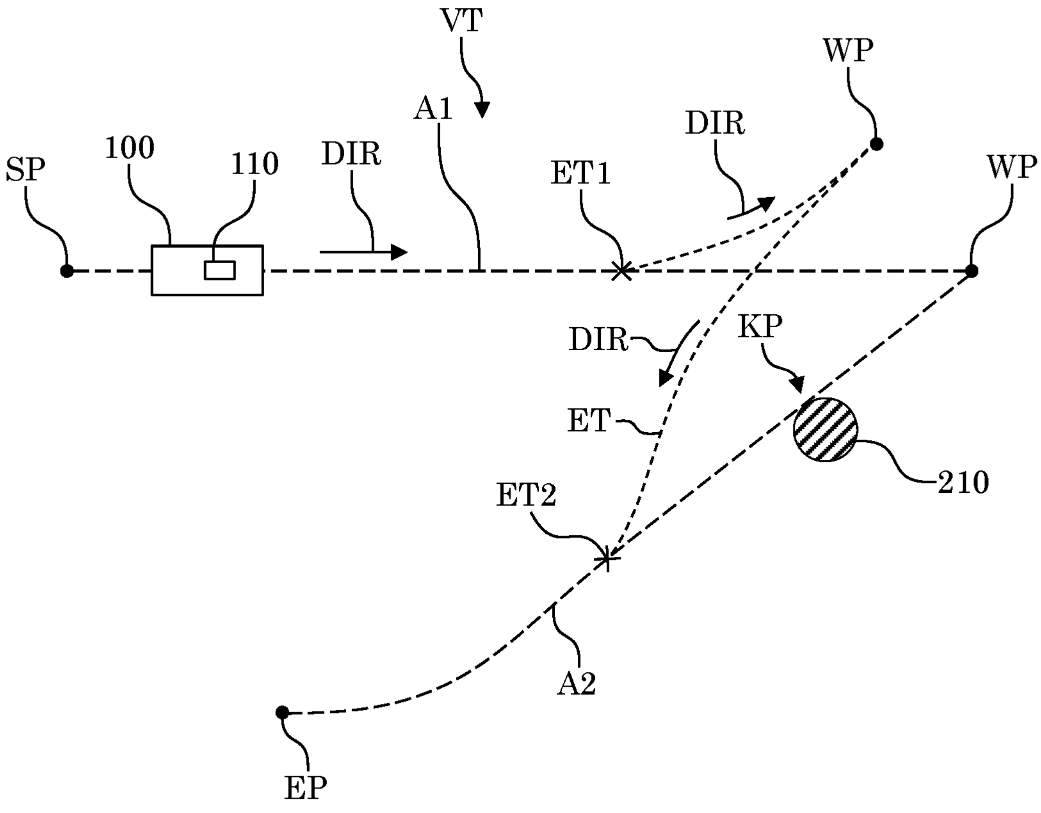
FIG. 4 shows a schematic view of a third example of a predefined trajectory and a replacement trajectory.

FIG. 4 shows a schematic view of a third example of a predefined trajectory VT and a replacement trajectory ET. The scenario of FIG. 4 differs from FIG. 2 and FIG. 3 by a different end position EP and by the fact that the obstacle 210 is arranged on the second section A2 of the predefined trajectory VT, which is behind the travel direction turning point WP.

The special feature in this example is that the replacement trajectory ET still departs from the predefined trajectory VT in the first section A1 before the travel direction turning point WP. The replacement trajectory ET in this example is similar to that described in FIG. 3.

Figure 5:
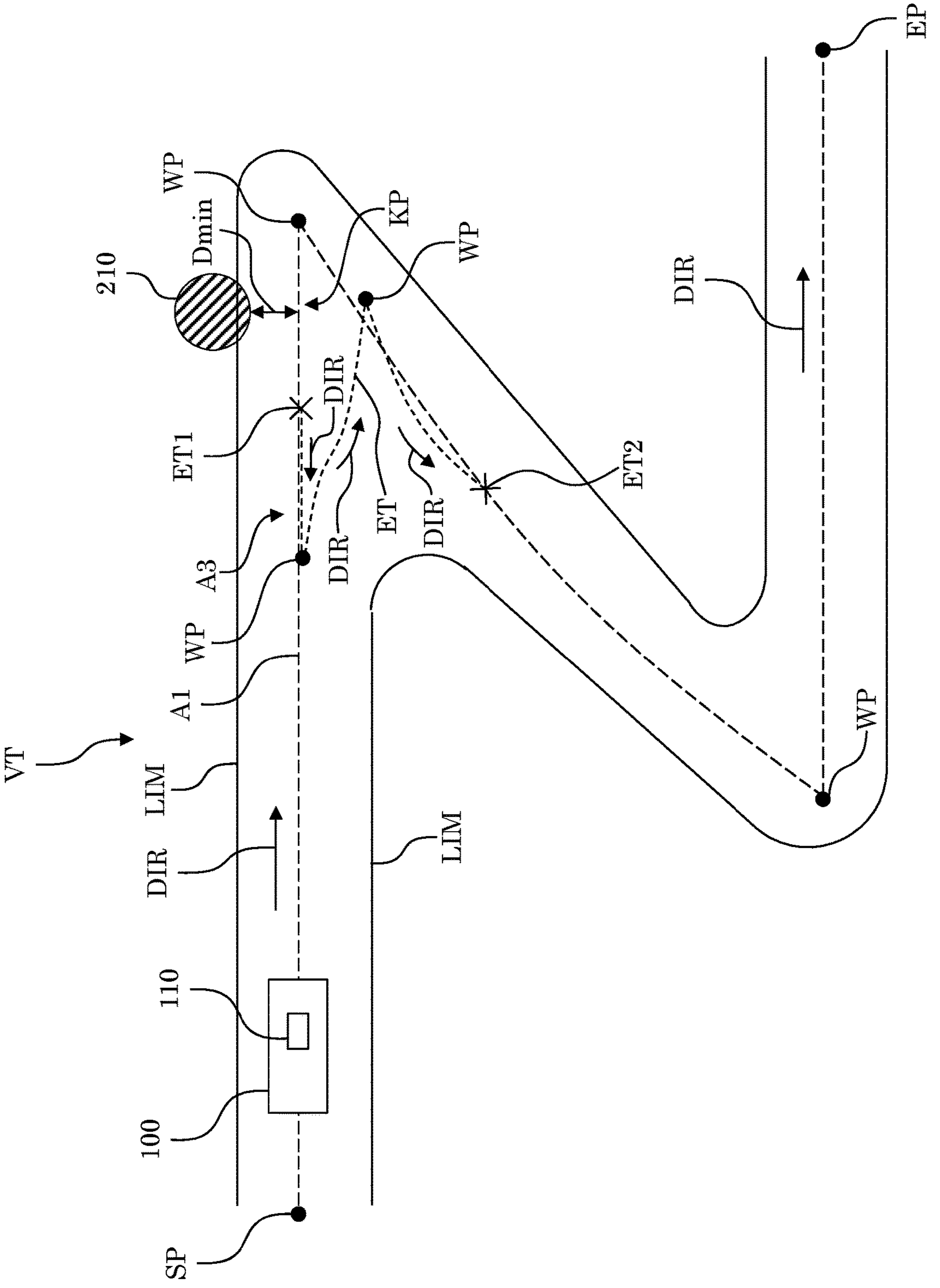
FIG. 5 shows a schematic view of a fourth example of a predefined trajectory and a replacement trajectory.

FIG. 5 shows a schematic view of a fourth example of a predefined trajectory VT and a replacement trajectory ET. In this fourth example, on the one hand, the obstacle 210 is not on the predefined trajectory VT, but somewhat nearby, and on the other hand, in addition to the predefined trajectory VT, two solid boundary lines LIM are shown, which, for example, limit the drivable region or the permissible region in which the replacement trajectory ET may run. In this example, it is thus ensured that the replacement trajectory ET does not deviate too far from the predefined trajectory VT.

The obstacle 210 has a distance Dmin from the predefined trajectory VT. The distance Dmin is below a minimum distance that must be maintained from an obstacle. Due to the vehicle geometry, for example, a collision would result at the collision point KP despite the distance Dmin, which is why the replacement trajectory ET is required. In this example, the collision point KP is only calculated when the vehicle 100 is already quite close to the obstacle 210, which is why the vehicle 100 must initially backtrack slightly. Therefore, the starting point ET1 corresponds to a travel direction turning point WP. An overlapping section A3 is formed, in which the predefined trajectory VT and the replacement trajectory ET overlap each other, but each having an opposite travel direction DIR. Due to the limitation LIM of the drivable region, a replacement trajectory ET as shown in the example of FIG. 2 is not possible in this case. The replacement trajectory ET therefore comprises two further travel direction turning points WP (thus three in total), at which the travel direction DIR of the vehicle 100 reverses. In this example, the replacement trajectory ET therefore comprises multiple sections that deviate from the predefined trajectory VT.

Figure 6:
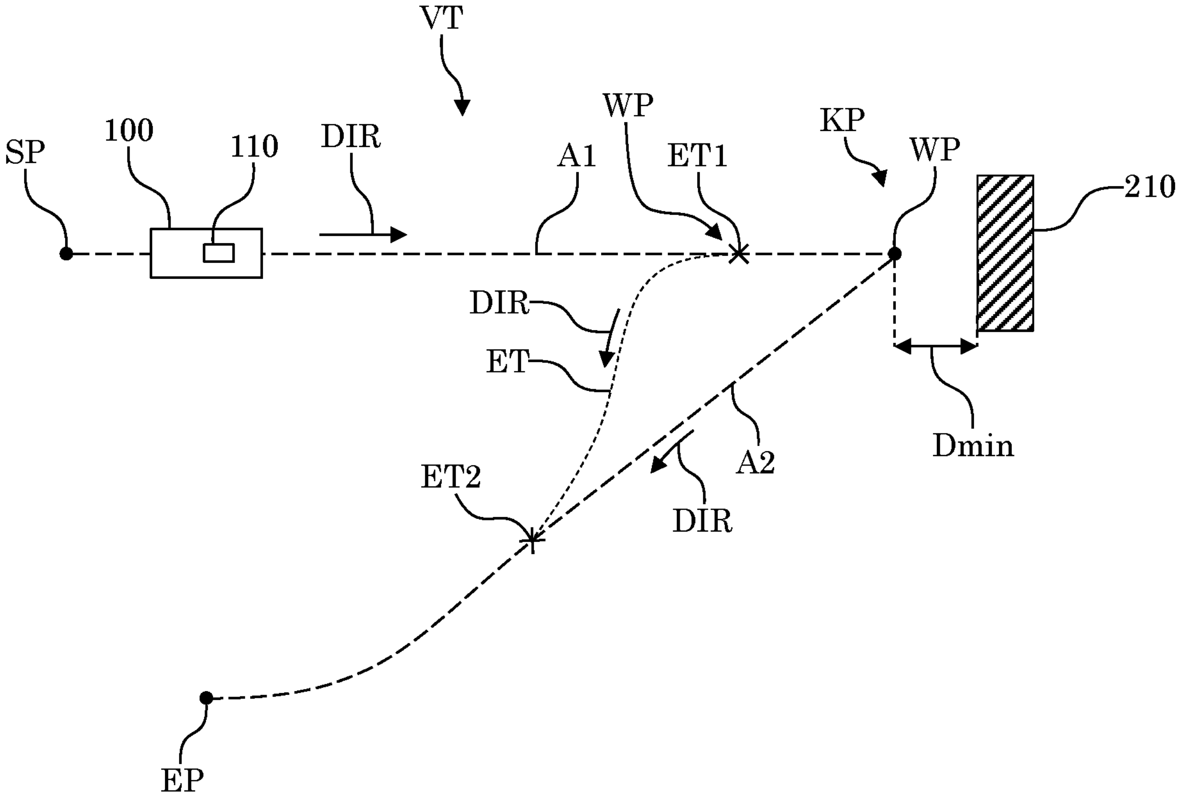
FIG. 6 shows a schematic view of a fifth example of a predefined trajectory and a replacement trajectory.

FIG. 6 shows a schematic view of a fifth example of a predefined trajectory VT and a replacement trajectory ET. In this example, the obstacle 210 is located behind the travel direction turning point WP of the predefined trajectory VT. However, the distance Dmin of the obstacle 210 from the predefined trajectory VT is, for example, below a safety distance which must be observed during the retracing procedure. Therefore, at (or even shortly before) the travel direction turning point WP of the predefined trajectory VT, a collision may occur at the collision point KP. Therefore, the vehicle 100 does not reach the travel direction turning point WP. A replacement trajectory ET is planned, the starting point ET1 of which is located shortly before the travel direction turning point WP and which is itself a travel direction turning point WP. The replacement trajectory ET leads from the starting point ET1 with as small an offset as possible relative to the predefined trajectory VT to the end point ET2 on the second section A2 of the predefined trajectory VT, from which point the autonomous driving is continued on the predefined trajectory VT.

Figure 7:
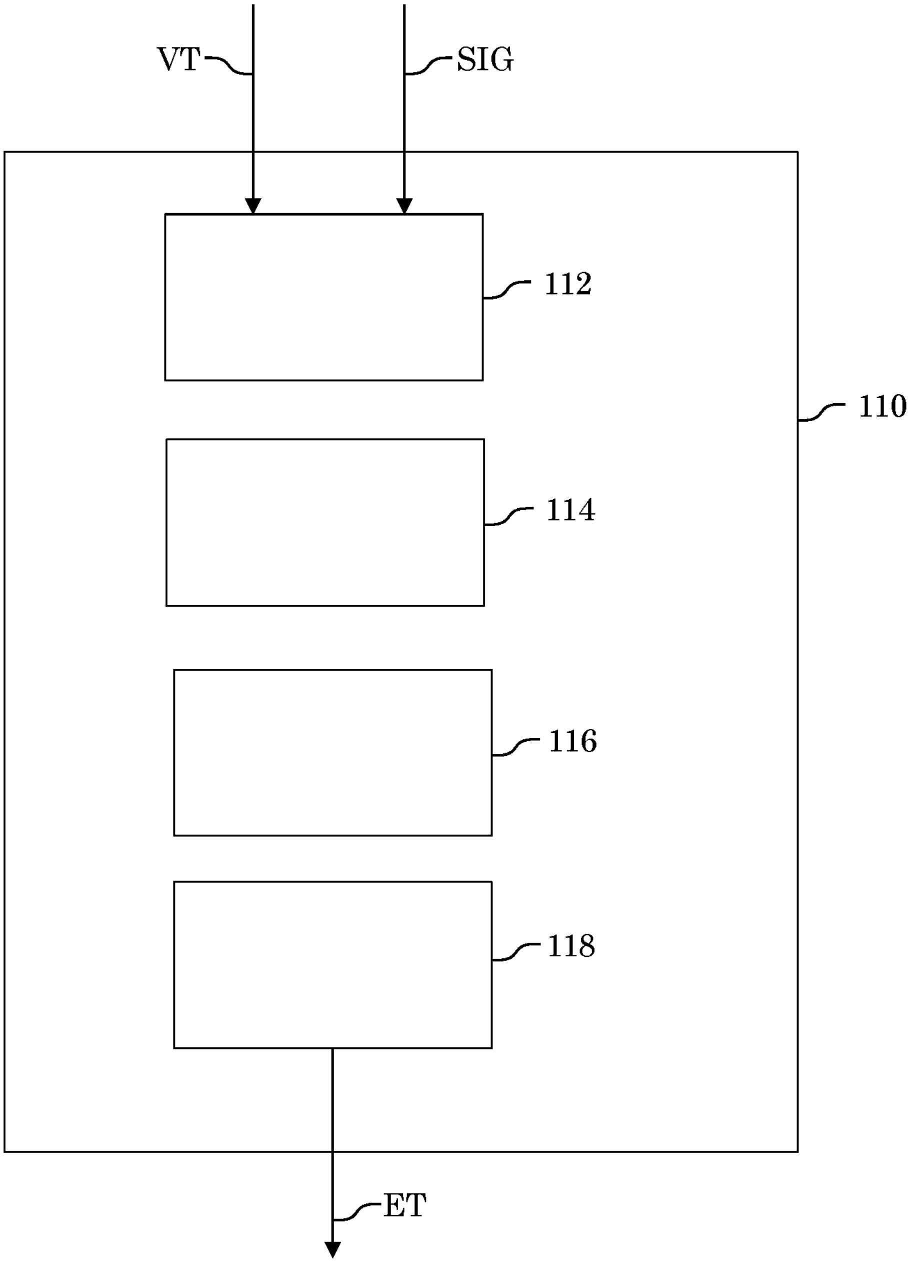
FIG. 7 shows a schematic block diagram of one exemplary embodiment of a parking assistance system.

FIG. 7 shows a schematic block diagram of one exemplary embodiment of a parking assistance system 110 for a vehicle 100 (see FIG. 1-6). The parking assistance system 110 is configured to drive the vehicle 100 automatically along a Trajectory VT, ET (see also FIGS. 2-6). The parking assistance system 110 comprises a receiving unit 112 for receiving a predefined trajectory VT that comprises at least a first section A1 (see FIG. 2-6) and a second section A2 (see FIG. 2-6) that are connected to one another at a travel direction turning point WP (see FIG. 2-6), wherein a travel direction DIR (see FIG. 2-6) of the first section A1 is different from a travel direction DIR of the second section A2, and for receiving a sensor signal SIG indicative of a surroundings 200 (see FIG. 1) of the vehicle 100. A detection unit 114 is configured to detect an obstacle 210 (see FIG. 2-6) in the surroundings 200 on the basis of the received sensor signal SIG. A calculation unit 116 is configured to calculate at least one collision point KP (see FIG. 2-6), which is a point on the predefined trajectory VT, at which a collision occurs between the vehicle 100 and the obstacle 210, on the basis of the predefined trajectory VT, the detected obstacle 210 and a vehicle geometry of the vehicle 100. An ascertaining unit 118 is configured to ascertain the replacement trajectory ET based on the at least one calculated collision point KP, wherein the replacement trajectory ET connects a starting point ET1 (see FIG. 2-6) on the predefined trajectory VT, which is located before the collision point KP, to an end point ET2 (see FIG. 2-6) on the predefined trajectory VT, which is located after the collision point KP, while avoiding the collision.

In this example, the ascertaining unit 118 outputs the replacement trajectory ET to a unit (not shown) outside the parking assistance system 110. Alternatively, it can be provided that the parking assistance system 110 causes the vehicle 100 to drive along the ascertained replacement trajectory ET.

The parking assistance system 110 and/or any unit of the parking assistance system 110, for example the reception unit 112, the detection unit 114, the calculation unit 116 and/or the ascertainment unit 118, may be implemented in the form of hardware and/or in the form of software. In the case of an implementation in the form of hardware, the parking assistance system 110 or the respective unit 112, 114, 116, 118 may be designed for example as a computer or as a microprocessor. In the case of an implementation in the form of software, the parking assistance system 110 or the respective unit 112, 114, 116, 118 may be designed as a computer program product, as a function, as a routine, as part of a program code or as an executable object. In particular, the parking assistance system 110 or the respective unit 112, 114, 116, 118 may be configured as part of a higher-level control computer or control system (not shown) of the vehicle 100.

Figure 8:
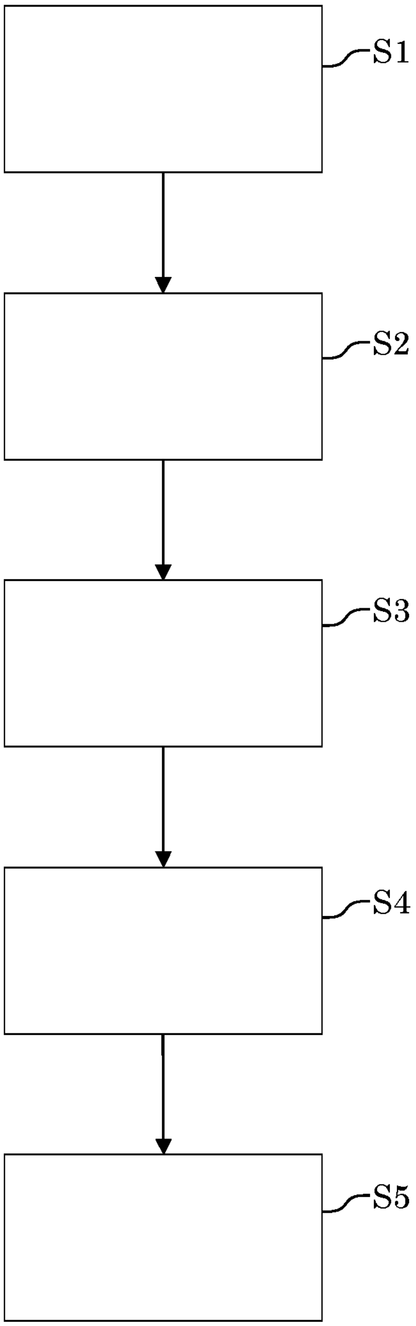
FIG. 8 shows a schematic block diagram of an exemplary embodiment of a method for ascertaining a replacement trajectory, Identical or functionally identical elements have been provided with the same reference signs in the figures, unless stated otherwise.

FIG. 8 shows a schematic block diagram of an exemplary embodiment of a method for ascertaining a replacement trajectory ET (see FIG. 2-7) for a vehicle 100 (see FIG. 1-6), which can be operated by means of a parking assistance system 110 (see FIG. 1-7) in an autonomous driving mode. In a first step S1, a predetermined trajectory VT (see FIG. 2-7) is received, comprising at least a first section A1 (see FIG. 2-6) and a second section A2 (see FIG. 2-6) which are connected to each other at a turning point WP (see FIG. 2-6), wherein a travel direction DIR (see FIG. 2-6) of the first section A1 is different, in particular reversed, relative to a travel direction DIR of the second section A2. In a second step S2, a sensor signal SIG indicative of surroundings 200 (see FIG. 1) of the vehicle 100 is received (see FIG. 7). In a third step S3, an obstacle 210 (see FIG. 2-6) is detected in the surroundings 200 based on the received sensor signal SIG. In a fourth step S4 at least one collision point KP (see FIG. 2-6), which is a point on the predefined trajectory VT, at which a collision occurs between the vehicle 100 and the obstacle 210, is calculated on the basis of the predefined trajectory VT, the detected obstacle 210 and a vehicle geometry of the vehicle 100. In a fifth step S5 the replacement trajectory ET is calculated based on the at least one calculated collision point KP, wherein the replacement trajectory ET connects a starting point ET1 (see FIG. 2-6) on the predefined trajectory VT, which is located before the collision point KP, to an end point ET2 (see FIG. 2-6) on the predefined trajectory VT, which is located after the collision point KP, while avoiding the collision.

This method is advantageously carried out with the parking assistance system 110 of FIG. 7. Although the present invention has been described on the basis of exemplary embodiments, it may be modified in many ways.

LIST OF REFERENCE SIGNS

100 vehicle
110 parking assistance system
112 reception unit
114 detection unit
116 calculation unit
118 ascertainment unit
120 optical sensor
130 ultrasonic sensor
210 obstacle
A1 first section
A2 second section
A3 overlapping section
DH distance
DIR travel direction
DK distance
Dmin distance
EP end position
ET replacement trajectory
ET1 starting point
ET2 end point
KP collision point
LIM boundary
S1 Method step
S2 Method step
S3 Method step
S4 Method step
S5 Method step
SIG sensor signal
SP start position
VT predefined trajectory
WP travel direction turning point

The invention claimed is:

1. A method for determining a replacement trajectory for a vehicle operated by means of a parking assistance system in an autonomous driving mode, comprising:

receiving a predefined trajectory that comprises at least a first section and a second section that are linked to one another at a travel direction turning point, wherein a travel direction of the first section is different from a travel direction of the second section;

receiving a sensor signal indicative of surroundings of the vehicle, detecting an obstacle in the surroundings on the basis of the received sensor signal;

calculating at least one collision point, which is a point on the predefined trajectory, at which a collision occurs between the vehicle and the obstacle, on the basis of the predefined trajectory, the detected obstacle and a vehicle geometry of the vehicle;

ascertaining the replacement trajectory based on the at least one calculated collision point, wherein the replacement trajectory connects a starting point on the predefined trajectory, which is located before the collision point, to an end point on the predefined trajectory, which is located after the collision point, while avoiding the collision;

driving the vehicle along the ascertained replacement trajectory with the parking assistance system, and backtracking on the predefined trajectory to bring the vehicle to an improved starting position for bypassing the obstacle, wherein the predefined trajectory comprises a trained trajectory recorded while the vehicle is manually driven in a training mode, wherein the sensor signal comprises a preprocessed digital environment map indicating detected obstacles in the surroundings of the vehicle, wherein the at least one collision point is calculated as a predefined minimum distance from the obstacle, and wherein a first distance between the at least one collision point and the starting point of the replacement trajectory is less than a predefined maximum distance.

2. A non-transitory storage medium, comprising commands which during the execution of the program by a computer, cause said computer to carry out the method as claimed in claim 1.

3. The method of claim 1, wherein the at least one collision point is arranged on the predefined trajectory before the travel direction turning point.

4. The method of claim 1, wherein the obstacle is located a second distance from the predefined trajectory, and the second distance is a non-zero distance that is less than the predefined minimum distance from the obstacle.

5. A parking assistance system for a vehicle, which is configured to drive the vehicle automatically along a trajectory comprising:

a receiving unit for receiving a predefined trajectory that comprises at least a first section and a second section that are linked to one another at a travel direction turning point, wherein a travel direction of the first section is different from a travel direction of the second section, and for receiving a sensor signal indicative of surroundings of the vehicle;

a detection unit for detecting an obstacle in the surroundings on the basis of the received sensor signal, a calculation unit for calculating at least one collision point, which is a point on the predefined trajectory, at which a collision occurs between the vehicle and the obstacle, on the basis of the predefined trajectory, the detected obstacle and a vehicle geometry of the vehicle, and an ascertaining unit for ascertaining a replacement trajectory based on the at least one calculated collision point, wherein the replacement trajectory connects a starting point on the predefined trajectory, which is located before the collision point, to an end point on the predefined trajectory, which is located after the collision point, while avoiding the collision, wherein the parking assistance system is configured for driving the vehicle automatically along the replacement trajectory;

wherein the predefined trajectory comprises a trained trajectory recorded while the vehicle is manually driven in a training mode;

wherein the parking assistance system is configured to cause the vehicle to backtrack on the predefined trajectory to bring the vehicle to an improved starting position for bypassing the obstacle, wherein the sensor signal comprises a preprocessed digital environment map indicating detected obstacles in the surroundings of the vehicle, wherein the calculation unit is configured to calculate the at least one collision point as a predefined minimum distance from the obstacle, and wherein a first distance between the at least one collision point and the starting point of the replacement trajectory is less than a predefined maximum distance.

6. A vehicle having a parking assistance system as claimed in claim 5.

* * * * *